United States Patent [19]

Coatney et al.

[11] 3,875,298

[45] Apr. 1, 1975

[54] CALCINATION OF STRONTIUM CARBONATE

[75] Inventors: Richard L. Coatney, Pleasanton; Lloyd M. Housh, Santa Clara; Merton L. Van Dreser, Pleasanton, all of Calif.

[73] Assignee: Kaiser Aluminum & Chemical Corporation, Oakland, Calif.

[22] Filed: July 17, 1973

[21] Appl. No.: 380,112

[52] U.S. Cl. ................................ 423/637, 423/177
[51] Int. Cl. ............................................. C01f 11/06
[58] Field of Search ........... 423/635, 636, 637, 173, 423/175, 177, 165

[56] References Cited
UNITED STATES PATENTS

| | | | |
|---|---|---|---|
| 886,607 | 5/1908 | Jacobs | 423/637 |
| 1,729,428 | 9/1929 | Lawson | 423/173 |
| 1,913,289 | 6/1933 | Rentschler | 423/637 |
| 2,016,529 | 10/1935 | Windecker | 423/637 |
| 2,016,530 | 10/1935 | Windecker | 423/637 X |
| 2,382,909 | 8/1945 | Pierce | 423/637 |

*Primary Examiner*—Edward J. Meros
*Assistant Examiner*—Brian E. Herarn
*Attorney, Agent, or Firm*—Paul E. Calrow; Malcolm McQuarrie

[57] ABSTRACT

Strontium carbonate can be calcined in a rotary kiln without excessive liquid formation if it is admixed with at least 8 percent finely divided carbon and the kiln is operated with not less than 2 percent combustibles in the exit gases when at least 85 percent of the strontium carbonate feed passes a 325 mesh screen. Under these conditions, the mixture of strontium carbonate and carbon forms aggolmerates soon after entering the kiln, minimizing premature burning of the carbon and preventing sticking of the strontium carbonate to the kiln wall.

16 Claims, No Drawings

CALCINATION OF STRONTIUM CARBONATE

BACKGROUND OF THE INVENTION

This invention concerns the thermal decomposition of strontium carbonate, particularly in a rotary kiln.

It is known to purify strontium carbonate by decomposing it at elevated temperatures to form strontium oxide, slaking the oxide in hot water to form a solution of strontium hydroxide, separating the insoluble impurities, and precipitating strontium carbonate again by carbonation, as set forth in more detail in U.S. Pat. No. 3,743,691.

However, it has been found that when calcination is carried out in a rotary kiln, the charge tends to melt at a temperature between about 1100° and 1150°C, a temperature which must be exceeded in order to decompose the strontium carbonate within a reasonable time. It is believed this melting occurs when the partial pressure of carbon dioxide over the decomposing carbonate and the resulting oxide is too high. For 99.9 percent pure $SrCO_3$ the critical partial pressure of $CO_2$ is slightly over 1 atmosphere, but for lower purity material (e.g., 85% $SrCO_3$) it is apparently lower, about 0.4 atmosphere.

It has been proposed to decompose strontium carbonate in a closed furnace in the presence of carbon black, as set forth in U.S. Pat. Nos. 1,782,830 and 2,382,909. It has also been proposed to decompose strontium carbonate in the presence of carbon in a hydrogen atmosphere, as disclosed in U.S. Pat. No. 1,947,952, and also in a closed vessel under a vacuum, as in U.S. Pat. No. 1,729,428. According to this last patent, the carbon used acts strictly as a catalyst, and is not consumed during the calcination. Similarly, it has been proposed to calcine barium carbonate in a rotary kiln with additions of both carbon and lime, as in U.S. Pat. No. 2,016,529, and also to calcine, in a fluidized bed, barium carbonate and carbon in the form of pellets made with an alkali metal carbonate, as in U.S. Pat. No. 3,059,999.

However, each of these prior art processes has drawbacks. For example, batch processes are relatively slow, and the maintenance of a special atmosphere, or a vacuum, requires expensive equipment. Also, hydrogen is known to be explosive and its use in an industrial process is to be avoided if possible. Similarly, operation of a fluidized bed reactor is generally more expensive than a rotary kiln, and the addition of other ingredients such as limestone or alkali metal carbonate increases the cost of, and reduces the yield from, the process.

Accordingly, this invention is directed to a method of calcining strontium carbonate in a rotary kiln without melting, using a carbon addition to the charge.

SUMMARY OF THE INVENTION

It has been discovered, according to this invention, that the problem of strontium carbonate melting during calcination in a rotary kiln can be overcome if the process is carried out by:

1. selecting a strontium carbonate substantially all of which passes a 200 mesh screen and at least 85 percent of which passes a 325 mesh screen;
2. admixing the strontium carbonate with at least 8 percent by weight, based on the weight of the strontium carbonate, carbon substantially all of which passes a 65 mesh screen at least, 75 percent of which passes a 100 mesh screen, and at least 25 percent of which is retained on a 200 mesh screen;
3. feeding the admixture to a rotary kiln; and
4. calcining the admixture at a temperature of at least 1150°C under conditions that produce not less than 2 percent combustibles in the kiln exit gases.

DETAILED DESCRIPTION

In calcining strontium carbonate heretofore, it has been found that the material shows evidence of liquid formation, and consequent sticking to the kiln lining, in two distinct temperature ranges.

The first liquid formation occurs at about 800° to 900°C, and is believed due to melting of unremoved sodium sulfate in the strontium carbonate. Liquid formation at this temperature is relatively minor, but can be enough to cause sticking of the feed to the kiln wall, building up a coating. It is believed the fine grinding of the strontium carbonate kiln feed prevents this lower temperature coating by enabling agglomeration of the feed early in the kiln.

The second temperature range of melting is between 1100° and 1150°C, the exact temperature depending on the purity of the strontium carbonate used. The melting at this stage is much more extensive, and can be total if the $CO_2$ pressure is high enough. The scientific literature indicates that such melting will occur with high purity materials when the $CO_2$ partial pressure over the system is more than about 1.1 atmospheres. This second stage melting can lead to massive build-up of rings within the rotary kiln. It is believed the presence of carbon in the charge at this higher temperature prevents such melting and ring formation.

It is believed the carbon in the charge plays at least two distinct roles in preventing the high temperature melting. First, it reacts with the carbon dioxide given off by decomposition of the strontium carbonate, forming carbon monoxide and holding the partial pressure of carbon dioxide below the critical value so as to prevent melting. In addition, after the carbon has burned out of the agglomerates, it leaves channels through which the gas evolved upon decomposition of the strontium carbonate can pass out of the agglomerates, again reducing the partial pressure of carbon dioxide at the site of the decomposition reaction.

Furthermore, it is believed the reducing atmosphere promotes volatilization of $Na_2SO_4$, which is molten at these temperatures and thus tends to impair the permeability of the decomposing charge. It is believed that when the charge does not contain carbon, a glassy coating forms on the surface of the agglomerates, at the calcination temperature, trapping any further evolved carbon dioxide within the agglomerates, thus raising the partial pressure of carbon dioxide within the agglomerates and causing complete melting of the material.

The strontium carbonate to be calcined according to the method of this invention can be obtained from any source. The invention has proven particularly useful with a strontium carbonate formed by metathesis of beneficiated celestite (strontium sulfate) with sodium carbonate to form sodium sulfate and strontium carbonate, as is well known in the art.

The strontium carbonate will substantially pass a 200 mesh screen and at least 85 percent, and preferably at least 95 percent, must pass a 325 mesh screen. It has been found that sizing the strontium carbonate so that at least 85 percent, and preferably at least 95 percent, is $-325$ mesh results in strengthening and hardening of balls or agglomerates formed soon after the feed enters the rotary kiln. By sintering the fine $SrCO_3$ particles into hard, coarse agglomerates, coating on the kiln wall at the first stage of liquid formation is prevented and the oxidation rate of the carbon below about 1000°C reduced. If the strontium carbonate is not of the required fine sizing, it can be milled by any of several suitable milling devices such as ball mills, Vibro-Energy mills, and the like. However, the fine sizing can be produced when the $SrCO_3$ is produced, as by methathesis, or earlier in the process, as by grinding the raw ore, for example celestite.

Fine sizing and consequent agglomeration of the charge in the kiln encases the carbon within the agglomerates, preventing early oxidation of the carbon when the charge reaches intermediate temperatures (i.e., 500° to 1000°C). Thus, the carbon remains in place and oxidizes during release of $CO_2$ from $SrCO_3$ by reducing the $CO_2$ to CO, lowering the partial pressure of carbon dioxide.

In addition to $SrCO_3$, the strontium carbonate will contain normal impurities such as unreacted strontium sulfate, barium sulfate, barium carbonate, calcium carbonate, silicates, and entrained sodium carbonate and sodium sulfate. The sodium contamination should be less than 2% $Na_2O$.

If the strontium carbonate is produced by the metathesis reaction referred to above, it will generally be in the form of thickened slurry or a filter cake of, for example, 70 to 90 weight per cent solids. If it needs to be ground to obtain the particle size specified for use in this invention, grinding is preferably carried out before addition of the carbon. It may be necessary to dilute the metathesized strontium carbonate, for example to a slurry containing 70 percent solids, to grind it. In any case, strontium carbonate of the requisite sizing is mixed with the carbon, preferably as a water slurry. Thorough mixing of the $SrCO_3$ and carbon has been found to be essential to preventing melting of the $SrCO_3$. Such mixing can readily be carried out by an impeller mixer in a tank. Whatever method of mixing is used, the resulting slurry will generally be filtered, for example to a water content of from 15 to 18 percent, based on the total weight of water and solids, before feeding to the rotary kiln. It has been found that a filter cake on the dry side, for example, about 15 percent water for material 90 percent passing 325 mesh, nodulizes better in the kiln. It will be understood that the precise amount of water needed to give a cake of the desired dryness will depend on the sizing of the feed, finer material requiring more water for a given firmness of cake.

The carbon used in the practice of this invention may be any such material, but preferably is petroleum coke, a well known material of commerce, most preferably calcined petroleum coke. The carbon is of a size so that substantially all passes a 65 mesh screen, at least 75 percent passes a 100 mesh screen, and at least 25 percent is retained on a 200 mesh screen. The carbon is preferably of the type known as delayed coke but the type known as fluid coke can be used. In any case, the coke is preferably calcined so that it contains less than 3.0 percent volatiles. A low volatiles content indicates a coke which has been highly calcined and is therefore relatively inert with respect to oxygen. Preferably it also has less than 2 percent sulfur and less than 2.5 percent ash. A typical analysis of a suitable calcined petroleum coke is: 0.02 percent water, 0.17 percent volatiles, 0.26 percent ash, 0.02 percent Fe, 0.04% V, and less than 1.7 percent sulfur, the balance being carbon. Low sulfur coke is desired since high sulfur coke has been found to react with $O_2$ more readily, and with $CO_2$ less readily, whereas the method of this invention requires carbon that resists reaction with any oxygen in the kiln but which will react with $CO_2$ to reduce it to CO and thus lower the $CO_2$ partial pressure.

It is essential that the carbon be of the sizing specified. Coarser material will not work as well, apparently because it is not in sufficiently close proximity to the decomposing $SrCO_3$ to maintain a sufficiently low $CO_2$ partial pressure; nor will finer material work, apparently because it oxidizes too rapidly at intermediate temperatures due to its high specific surface.

The term "per cent combustibles", with regard to the gases exiting from the rotary kiln, refers to a standard method of instrumentation wherein all combustible materials in the flue gas are burned and the heat generated determined. The output reading of the instrument is calibrated in terms of the volume per cent of hydrogen (or other standard gas, if desired) in the gas which would give the same heat release were hydrogen the only combustible gas present. Obviously, other combustible gases, for example, carbon monoxide, may be present in the exit gases, and the output reading on the instrumentation will depend on the fuel value of all the gases present. However, for purposes of this specification, reference to "per cent combustibles" refers to a reading using hydrogen as the standard gas.

If the per cent combustibles in the exit gases is too low, the carbon in the feed burns too soon in the kiln (i.e., at too low a temperature), and melting of the charge occurs at the decomposition temperature. If too high a percentage of combustibles is present in the exit gases, due to reduced secondary air, the hot zone is near the discharge or lower end of the kiln and all the carbon is not consumed in the kiln. Thus, the solid material discharged from the kiln contains free carbon which will burn on contact with air and may also contaminate the kiln product. When the exit gases contain the correct amount of combustibles, a definite flame can be seen over the charge as the carbon monoxide emerging from the bed burns upon contact with air, particularly secondary air, in the kiln near the discharge end. It is desired that this "CO fire" occur some 20 to 35 feet from the discharge end of a kiln 170 feet long. In the last section of the kiln below the CO fire, the atmosphere is oxidizing because of the presence of secondary air; this oxidizing atmosphere tends to oxidize any sulfides present to sulfates, which are insoluble in subsequent processing.

It will be understood that the per cent combustibles in the kiln exit gases is controlled by the manner of operating the kiln burner, more specifically by the amount of draft in the kiln stack and the amount of primary and secondary air, and the relative proportions of these, admitted to the kiln in relation to the amount of fuel. Similarly, the location of the CO fire within the kiln can be controlled by changing the amount of secondary air. While the amount of combustibles in the exit gases when the kiln is operated without melting of the charge will vary depending on the firing conditions, it has been found that the per cent combustibles is between 2 percent and 5 percent under good operating conditions. Naturally, for most economic operation an attempt will be made to operate with the minimum amount of combustibles in the exit gases consistent with firing the charge without melting.

Although decomposition of strontium carbonate occurs at about 1150°C, for practical decomposition rates it is preferred that the kiln be operated at a temperature of at least 1300°C. Excessive temperatures, for example above 1400°C, should be avoided since they increase the tendency toward melting of the charge, particularly melting due to impurities, and also tend to increase the loss of strontium values due to reaction with impurities and with the kiln lining. It has been found that a long residence time in the kiln is not essential. For example, in a test kiln up to 95 percent of the $SrCO_3$ was decomposed within a few minutes, typically less than 15, after the material was heated to 1200°C or above. Accordingly, the rotary kiln will be operated at a relatively high rate of rotation (e.g., 1 to 1.5 revolutions per minute for a 7.5 foot inside diameter kiln) to minimize the residence time of carbon in the kiln at temperatures where it might oxidize too soon (i.e., from about 500° to about 1100°C).

EXAMPLE

Strontium carbonate was produced by metathesizing beneficiated celestite ore ($SrSO_4$) with sodium carbonate. The strontium carbonate produced showed the following typical chemical analysis: 63% SrO, 28% $CO_2$, 1.4% BaO, 2.2% CaO, 1.5% $SiO_2$, 0.3% $Al_2O_3$, 0.2% $Fe_2O_3$, 1.2% $Na_2O$, and 2.2% $SO_3$. The metathesis product substantially all passed a 28 mesh screen and about 60 percent passed a 200 mesh screen.

The material was ground in a Sweco Model No. M80 Vibro-Energy mill after dilution to a slurry of 71 percent by weight solids concentration. Ten pounds of calcined delayed petroleum coke were added to the slurry for each 100 pounds of milled dry material contained therein. The petroleum coke showed the following typical analysis: 1.9 percent volatiles (as determined by ASTM 0-271-71), 0.7 percent ash, and 2.0 percent sulfur, the remainder being carbon. The petroleum coke all passed a 65 mesh screen and 50 percent passed a 200 mesh screen.

The admixture was filtered to a cake containing 15 percent water, and the cake fed to a 7.5 foot inside diameter rotary kiln 170 feet long turning 1.2 revolutions per minute. The feed was observed to form balls or agglomerates within 20 to 40 feet of the feed end of the kiln. The peak temperature in the kiln was maintained at about 1350°C, and the combustion controls adjusted so the kiln exhaust gases analyzed at least 3 percent combustibles, as measured on a Bailey combustion analyzer calibrated on hydrogen. The charge passed through the rotary kiln without formation of rings and without melting in the hot zone, conditions which had been observed in the same kiln when similar material, without any addition of carbon, had been fired to the same temperature.

The preceding example can be compared with another test in which the same feed material, including the coke addition, was processed in exactly the same way except that the strontium carbonate was not milled prior to adding the coke, the unmilled feed being 65 percent plus 325 mesh. This feed formed nodules in the kiln, but they were soft and suffered considerable dusting. This fine dust material stuck at about 900°C, forming a coating on the kiln wall about 60 to 100 feet from the burner end of the kiln.

The example can also be compared to a test in which the same material was processed in exactly the same way except that the burner and draft were operated so the flue exit gases showed a combustibles reading of only 0.5%. Under these conditions, the charge melted at about 1150°C, forming a ring in the kiln at about 60 feet from the burner end.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 325 mesh to 44 microns. Analyses of mineral components are reported in the usual manner, expressed as simple oxides, e.g. SrO and $SiO_2$, although the components may actually be present in various combinations, e.g. as a strontium silicate.

What is claimed is:

1. Method of calcining strontium carbonate in a rotary kiln to form strontium oxide comprising:
   1. selecting a strontium carbonate substantially all of which passes a 200 mesh screen and at least 85 percent of which passes a 325 mesh screen;
   2. admixing the strontium carbonate with at least 8 percent by weight, based on the weight of the strontium carbonate, carbon substantially all of which passes a 65 mesh screen, at least 75 percent of which passes a 100 mesh screen, and at least 25 percent of which is retained on a 200 mesh screen;
   3. feeding the admixture to a rotary kiln without the addition of other ingredients such as limestone; and
   4. calcining the admixture at a temperature of at least 1150°C under conditions that produce not less than 2 percent combustibles in the kiln exit gases.

2. Method according to claim 1 wherein the strontium carbonate and carbon are mixed as a water slurry.

3. Method according to claim 2 wherein the slurry is filtered to a solids content of at least 80 percent by weight before being fed to the rotary kiln.

4. Method according to claim 1 wherein at least 95% of the strontium carbonate passes a 325 mesh screen.

5. Method according to claim 1 wherein the carbon is delayed petroleum coke.

6. Method according to claim 5 wherein the coke contains, based on the weight of the coke, less than 3 percent volatiles.

7. Method according to claim 6 wherein the coke contains, based on the weight of the coke, less than 2 percent sulfur and less than 2.5 percent ash.

8. Method according to claim 4 wherein the strontium carbonate and the coke are mixed as a water slurry.

9. Method according to claim 8 wherein the slurry is filtered to a solids content of at least 80 percent by weight before being fed to the rotary kiln.

10. Method according to claim 4 wherein the carbon is delayed petroleum coke.

11. Method according to claim 10 wherein the coke contains, based on the weight of the coke, less than 3 percent volatiles.

12. Method according to claim 11 wherein the coke contains, based on the weight of the coke, less than 2 percent sulfur and less than 2.5 percent ash.

13. Method according to claim 10 wherein the strontium carbonate and the coke are mixed as a water slurry.

14. Method according to claim 13 wherein the slurry is filtered to a solids content of at least 80 percent by weight before being fed to the rotary kiln.

15. Method according to claim 14 wherein the coke contains, based on the weight of the coke, less than 3 percent volatiles.

16. Method according to claim 15 wherein the coke contains, based on the weight of the coke, less than 2 percent sulfur and less than 2.5 percent ash.

* * * * *